United States Patent
Ittmann et al.

[11] Patent Number: 5,882,560
[45] Date of Patent: Mar. 16, 1999

[54] METHOD FOR PRODUCING HIGH FILLER CONTENT PLASTIC MOLDED ARTICLES WHICH RESEMBLE GRANITE

[75] Inventors: Gunther Ittmann, Gross-Umstadt; Manfred Krieg, Darmstadt, both of Germany

[73] Assignee: Roehm GmbH Chemische Fabrik, Darmstadt, Germany

[21] Appl. No.: 653,111

[22] Filed: May 23, 1996

Related U.S. Application Data

[63] Continuation of Ser. No. 295,414, Aug. 25, 1994, abandoned.

[30] Foreign Application Priority Data

Aug. 25, 1993 [DE] Germany ............ 43 28 545.7

[51] Int. Cl.[6] ............................... B29C 39/12
[52] U.S. Cl. ............ 264/122; 264/331.18; 264/DIG. 31
[58] Field of Search ............................. 264/109, 122, 264/236, 245, 331.18, DIG. 31

[56] References Cited

U.S. PATENT DOCUMENTS

| | | | |
|---|---|---|---|
| 3,847,865 | 11/1974 | Duggins ................... | 524/437 |
| 4,085,246 | 4/1978 | Buser et al. ............... | 428/220 |
| 4,159,301 | 6/1979 | Buser et al. ............... | 264/331.15 |
| 4,221,697 | 9/1980 | Osborn et al. ............. | 524/853 |
| 4,251,576 | 2/1981 | Osborn et al. ............. | 428/331 |
| 4,590,219 | 5/1986 | Nissen et al. ............. | 264/45.3 |
| 4,786,660 | 11/1988 | Ittmann et al. . | |
| 4,826,901 | 5/1989 | Ittmann et al. . | |
| 4,957,987 | 9/1990 | Krieg et al. ............... | 526/258 |
| 5,202,075 | 4/1993 | Barnard et al. ............ | 264/331.18 |
| 5,266,253 | 11/1993 | Dijkhuizen et al. ........ | 264/112 |
| 5,280,051 | 1/1994 | Traverso et al. ........... | 264/122 |
| 5,387,634 | 2/1995 | Lichtenstein et al. ..... | 524/321 |

FOREIGN PATENT DOCUMENTS

| | | |
|---|---|---|
| 36837/89 | 12/1989 | Australia . |
| 0 214 511 | 3/1987 | European Pat. Off. . |
| 0 218 866 | 6/1989 | European Pat. Off. . |
| 2449 656 C2 | 1/1983 | Germany . |
| 2627 081 C2 | 8/1987 | Germany . |
| 3821 116 A1 | 12/1989 | Germany . |
| WO 91/11404 | 8/1991 | WIPO . |

OTHER PUBLICATIONS

McGraw–Hill Encyc. of Science & Technology, vol. 11, pp. 116–117, 7th edition, ©.
Chemistry, 2nd edition, Gillespie et al., pp. 996–1002, ©1986.
Inorganic Chemistry, Porterfield, pp. 122–127, ©1984.
Patent Abstracts of Japan, vol. 14, No. 435 (C–760)(4378), Sep. 18, 1990, JP–A–02 170 847, Jul. 2, 1990.

*Primary Examiner*—Allan R. Kuhns
*Assistant Examiner*—Kenneth M. Jones
*Attorney, Agent, or Firm*—Oblon, Spivak, McClelland, Maier & Neustadt, P.C.

[57] ABSTRACT

Filled plastic molded articles based on polymethyl methacrylate (PMMA), which articles resemble granite, are prepared by preparing a casting resin suspension comprising: (A) 20–80 parts by wt. (pbw) of a liquid PMMA polymer precursor; (B) 0–75 pbw of a non-metallized particulate filler; (C) 0–5 pbw, based on the sum of components (A) and (B) of a polymerizable organosilicon compound; and (D) 0–2 wt. % of at least one pigment or colorant; suspending metallic appearing particles of a platelet-like stratified silicate (SS) in the particle size range of 20–500 $\mu$m in an amount of 1–35 pbw, based on the sum of components (A) and (B); polymerizing the suspension under free radical conditions in a polymerization mold; and removing the polymerized article from the mold.

9 Claims, No Drawings

5,882,560

METHOD FOR PRODUCING HIGH FILLER CONTENT PLASTIC MOLDED ARTICLES WHICH RESEMBLE GRANITE

This application is a Continuation of application Ser. No. 08/295,414, filed on Aug. 25, 1994, now abandoned.

BACKGROUND OF THE INVENTION

1. Field of the Invention:

The invention relates to high filler content plastic molded articles which resemble granite, which articles are based on polymethyl methacrylate (PMMA) and contain decorative pigments.

2. Discussion of the Background:

High filler content plastic resins which resemble various rocks have been long known (see 1992, Ullmann's Encyclopedia of Industrial Chemistry, 5th Ed., Vol. A 20, pub. VCH, pp. 494–500).

In this connection, imitation marbles and granites have achieved particular industrial interest and importance.

Thus, Ger. Pat. 2,627,081 discloses an imitation granite based on irregular distribution of two discrete types of filler particles in a PMMA matrix, which particles are namely (1) colored or colorless, non-translucent particles; and
(2) colored or colorless, translucent or transparent particles;
   wherewith both types of particles have minimum particle size (taken as the minimum dimension) >200 micron. An index of refraction $n_D$ of the PMMA material and the filler material of 1.4–1.6 is prescribed.

PCT OS WO 91/11,404 discloses an imitation granite which is colored and which is comprised of:

(i) a matrix containing PMMA and particles of aluminum oxide trihydrate, which particles are of length <100 micron; (ii) PMMA particles in the 100–5,000 micron size range, filled with 50–70 wt. % of aluminum oxide trihydrate and up to 2.5 wt. % of a colorless-to-white pigment; (iii) PMMA particles in the 100–5,000 micron size range, filled with 0.1–2.5 wt. % black pigment; and (iv) PMMA particles in the 100–5,000 micron size range, filled with pigments of other colors. The tendency of the larger particles to settle is countered by the use of rheologically effective additives.

The teaching of PCT OS WO 90-01,470 (the same applicant as WO 91/11,404) is different as to the particle sizes and pigment(s).

Ger. OS 38 21 116 discloses colored polyacrylate plates with a stone appearance. The precursor of the matrix polymer is homogeneously colored. A pulverized acrylic resin, also colored but of a color different from that of the matrix polymer, is subsequently added and distributed into the matrix polymer. After conclusion of the polymerization, the molded articles in which the original pulverized acrylic resin has settled are removed from the mold. However, the existing methods of manufacturing molded plastic articles which resemble granite involve relatively complex systems and procedures.

SUMMARY OF THE INVENTION

Accordingly, one object of the present invention, with the known technology as a basis, is to devise filled casting resins which in simple manner are used to produce plastic molded articles which resemble granite and are of the highest quality.

Briefly, this object and other objects of the present invention as hereinafter will become more readily apparent can be attained by a method of producing filled plastic molded articles based on PMMA, which articles resemble granite, wherewith a polymerization chamber is employed in which forming is accomplished, wherewith metallic-appearing particles are distributed in a casting resin suspension which suspension is comprised of A) 80–20 parts by weight (pbw) of a liquid PMMA polymer precursor;
B) 0–75, preferably 40–75 pbw of a (non-metallized) particulate filler;
C) 0–5 pbw (based on the sum of A and B) of a polymerizable organosilicon compound, as an adhesion promoter; and
D) 0–2 wt. % of one or more pigments or colorants; wherewith the aforesaid metallic-appearing particles are of a platelet-like stratified silicate (SS) in the particle size range 20–500 micron, used in the amount of 1–35 pbw (based on the sum of A and B); and wherewith the freeradical polymerization is carried out to completion. Preferably, the sum of A and B is 100 pbw.

DETAILED DESCRIPTION OF THE PREFERRED EMBODIMENTS

The present method may be carried out directly on the basis of the state of the art (see Ullmanns Encyclopedia der Technischen Chemie, 4th Ed., Vol. 19, pub. Verlag Chemie, pp. 22–23; 1967, Rauch-Puntigam, H. and Voelker, Th., "Acryl- und Methacrylverbindungen", pub. Sprinqer-Verlaq, p. 274–280).

The liquid PMMA polymer precursor (prepolymer) preferably is comprised of incipiently polymerized monomers, which may contain, e.g., c. 5 wt. % polymer.

The monomer employed comprises methyl methacrylate, of normal purity, in the amount of 80–100% of the total monomers. Suitable comonomers include the usual comonomers such as acrylic esters of the likes of butyl acrylate, ethylhexyl (meth)acrylate, and methyl acrylate); (meth) acrylic acid, (possibly substituted) amides of (meth)acrylic acid, (meth)acrylonitrile, styrene and alkylated derivatives of styrene, vinyl acetate, and the like.

Suitable candidates for use as the liquid polymer precursor are monomers and monomer mixtures such as described in Eur. Pat. 218,866. The monomers, which preferably contain a prepolymer, are polymerized by radical polymerization to form the polymer, which is solid at room temperature (see Ger. Pat. 2,449,656; Eur. Pats. 214,511 and 218,866). In general the liquid polymer precursor should have a viscosity of <5 Pa-sec, preferably<0.5 Pasec, at the temperature proposed for carrying out the forming.

It is also possible to employ cross-linking monomers, e.g. unsaturated esters of polyhydric alcohols such as ethylene glycol di(meth)acrylate, 1,4-butanediol di(meth)acrylate, and triglycol di(meth)acrylate), and allyl compounds such as allyl methacrylate, triallyl cyanurate, and triallyl isocyanurate, in amounts of up to 10 wt. %, generally 0.1–8 wt. % based on the sum of A and B.

If it is desired to control the molecular weight, known regulators may be employed in the known concentrations, e.g. 0.01–0.5 wt. %, preferably 0.05–0.2 wt. %, based on the weight of the monomers. Molecular weight regulators which might be mentioned include organic sulfur compounds (see Rauch-Puntigam and Voelker, loc.cit.). In general, the molecular weights of the (uncross-linked) matrix polymer are in the range 200,000 to 5,000,000 Dalton (determined by gel permeation chromatography). The VICAT softening temperature is above 100° C., as a rule. In addition, the polymerization mixtures may contain auxiliary substances which are per se known such as UV absorbers, plasticizers, antioxidants, fireproofing agents, and the like.

The agents primarily responsible for the resemblance to granite are the inventively employed metallic-appearing particles of a platelet-like stratified silicate (SS) in the particle size range of 20–500 micron, used in the amount of 1–35 pbw (based on the sum of A and B) in the suspension of casting resin. In particular, such particles have a surface which has a gold- or silver luster. This in itself differentiates them from the known characteristics of component B.

Of particular interest are decorative pigments, so called "Decor-Pigments", manufactured by Naintsch (Graz, Austria). Their chemical composition is: $SiO_2$ 34±2%, MgO 32±2%, $Al_2O_3$ 20±1.5%, $Fe_2O_3$ 11±1%, $K_2O$ 1.2±0.5%, and CaO 0.1±0.05%. The density of the pigments is 2.3 kg/cu dm, and the melting point is >1300° C. The various size classifications are prepared by grinding following by screening. The pigments range in particle size between 32 and 500 micron. Decor-Pigments, manufactured by Naintsch correspond to laminated air gap interference pigments characterized by contiguous layers of medium to low refraction minerals with thin intercalated air gaps less than 1 $\mu$m thick and by a diameter to thickness ratio of the laminae between 1:5 and 1:50, as disclosed in EP 368,973. These pigments are obtained by subjecting three- and four-layer phyllosilicates to a heat treatment at a temperature greater than that at which $H_2O$, OH or F are released.

The pigments have a gold or silver luster in the particle diameter ranges of 250–500 $\mu$m, 125–250 $\mu$m, 63–125 $\mu$m and 32–63 $\mu$m. The stratified silicates (SS) may be used in the form of solely inorganic mineral components. In such a case, e.g. 33.3 pbw of SSs of particle diameters in the 250–500 micron range may be mixed into component A. It is preferred to mix SSs having a silver luster and particle diameters in the 125–250 $\mu$m range in amounts of 5 pbw, into suspensions with a content of cristobalite filler material of c. 60 wt. %. According to another advantageous embodiment, SSs having a gold luster and a 125–250 $\mu$m particle diameter.

It is very advantageous to use (non-metallized) particulate fillers along with the metallic-appearing particles. Such (nonmetallized) fillers may be inorganic materials which are suitable for use with casting resins; e.g., aluminum oxides and/or aluminum oxide hydrates, alkali- and/or alkaline earth oxides, silicon dioxide and/or titanium dioxide in their various modifications, clays, silicates, oxides, coals or other carbon materials, metals or metal alloys, synthetic materials such as ceramics, glass powder, porcelain, various types of slags and cinders, finely divided silicon dioxide, kaolin, talc, mica, feldspar, apatite, barite, gypsum, chalk, limestone, dolomite, etc., singly or in mixtures. Particularly preferred are quartzes, aluminum hydroxide, and aluminum oxide hydrate.

Advantageously the mean particle size (diameter) of inorganic fillers used is <100 $\mu$m, preferably<75 $\mu$m.

Preferably the inorganic filler is such that the hardened casting resin as a rule has a shear modulus of elasticity of at least 5 GN/sq m, preferably at least 10 GN/sq m. (In adjusting the mechanical properties of the material, the proposed application for the casting resin should be borne in mind.) The preparation of the fillers in the advantageous particle sizes may be by known methods, e.g. crushing and milling.

In addition, the organosilicon compounds of group C may be used in known fashion as adhesion promoters for the filler materials. Principal candidates are functional organosilicon compounds with at least one ethylenically unsaturated group in the molecule. The functional moiety bearing the ethylenically unsaturated group is generally linked to the central silicon atom via a carbon atom. The remaining ligands to the silicon are, as a rule, alkoxy groups with 1–6 C atoms, wherewith ether bridges may additionally be present in the alkyl group. Examples which might be cited are trialkoxysilanes, e.g. vinyl trialkoxysilanes, or organosilicon compounds in which the C=C double bond is connected to the Si atom via one or more C atoms, e.g. allyl trialkoxysilanes or α-methacryloyloxypropyl trialkoxysilanes. Also, dialkoxysilanes may be used, wherein a second functional moiety is connected to the Si atom, which second functional moiety also has a C=C double bond (and is usually identical with the first), but may alternatively be an alkyl group with (preferably) 1–6 C atoms. Examples of possible organosilicon components are vinyl trimethoxysilane, vinyl triethoxysilane, vinyl triacetoxysilane, vinyl tris (methoxyethoxy)silane, divinyl dimethoxysilane, vinyl methyl dimethoxysilane, vinyl trichlorosilane, αmethacryloyloxypropyl trimethoxysilane, αmethacryloyloxypropyl tris(methoxyethoxy)silane, and mixtures of these. Advantageously, the organosilicon compounds are employed together with catalysts of the amine type, particularly of the type of alkylamines with 2–6 C atoms, preferably n-butylamine. The amine catalyst is generally employed in amounts of 0.5–10 wt. %, preferably 1–5 wt. % (based on the weight of the organosilicon compound). In general the ratio of inorganic filler B to organosilicon compounds C (by weight) is in the range 500:1 to 20:1, preferably (50±25):1.

Also added to the polymerization mixtures are suitable pigments and/or colorants D which are per se known; possibly as mixtures, and in amounts of 0–2 wt. % (see Ullmann's, 5th Ed., Vol. A 20, loc.cit.). Examples which might particularly be mentioned are titanium dioxide, iron oxide, zinc white, ultramarine blue, and carbon black. The pigments may also be added as pre-formed dispersions, to the organic phase -A.

Very impressive color effects can be produced by addition of dyes and the like which are soluble in the monomers. The amounts of the added soluble dyes are in the range of 0–0.5 wt. % (based on the weight of the monomer phase).

Preparation of the suspensions of casting resin:

Advantageously in preparing the casting resin suspensions one begins with the liquid polymer precursor A, which contains the monomers, the prepolymers, and (possibly) the organosilicon component C, and which forms the organic phase.

Then the inorganic filler B and the pigments and/or dyes PF are distributed in the organic phase, with the aid of a mechanical dissolving device.

As a rule the process is finished in 10 min. Then the suspension is dispersed for c. 10 min on the dissolver which is operated at a rotational speed of c. 10–20 m/sec. In general the inorganic fillers B are added to the organic phase A in such a way that the viscosity does not rise above c. 10 Pa-sec.

The organosilicon compounds C which may be employed are added to the organic phase A before the fillers are added. Alternatively, the filler B can be silanized prior to addition to the organic phase A, e.g. by dry silanization. The prescribed amount of stratified silicates (SSs) is added to the resulting suspension, preferably with the aid of a dissolving device, until uniform distribution is achieved. Then the auxiliary substances for the polymerization are dissolved; these comprise, e.g., per se known polymerization initiators added in amounts of 0.1–5 wt. % (based on the weight of the monomers). The initiators used are radical-formers which can be induced to decompose to form radicals by heating or by redox processes. Basically, any initiators may be used which provide a high input of radicals at relatively low temperatures (see Brandrup, J., and Immergut, E. H., 1989, "Polymer Handbook", 3rd Ed, pub. J. Wiley, Chap. III, pp. 1–65). Initiators which might be mentioned are, e.g., peroxyesters, e.g. bis(4-tert-butylcyclohexyl)-peroxydicarbonate. Advantageously the initiators are not added until shortly before the charging and hardening of the casting resin suspensions. It may be advantageous to provide the casting resin suspension with interior and/or exterior parting agents to counter adhesion of the hardened casting resin to the mold and promote good surface characteristics of the articles molded from the casting resin. Examples of interior parting agents are alkali- and alkaline earth salts of fatty acids, alkyl phosphates, and neutralized derivatives of these. Suitable exterior parting agents may be, e.g., coatings applied to the mold, e.g. coatings comprising polytetrafluoroethylene, polyorganosiloxane, or polyvinyl alcohol.

Producing the molded articles comprised of the casting resin:

The inventive casting resin suspension to which the polymerization initiator has been added may be, e.g., poured into customary casting molds. Advantageously, the suspension is subjected to a vacuum prior to the charging of the molds. The hardening (polymerization of the organic phase A) is preferably accomplished thermally, e.g. by heating to 50°–80° C. for 20–60 min. The hardening may be carried out with or without application of pressure.

Molds of a wide variety of shapes can be charged using the inventive casting resin suspensions, and the polymerization can proceed without technical problems. The method can be used to manufacture plates, bowls, dishpans, wash basins, toilet bowls, molded articles for the construction industry, machine bases, containers, and the like.

In an advantageous refinement of the invention, plate material is produced continuously on a conveyor belt. For this, the casting resin suspension to which a suitable polymerization initiator has been added is applied to a running conveyor belt having lateral barriers, wherewith because of its low flow viscosity and low structural viscosity the suspension quickly distributes and levels itself. Thereafter a second metal belt is applied over the surface of the suspension. The suspension may be hardened thermally, either by heating the two metal belts or by the use of suitable redox initiators (with or without extrinsic heating).

The residual monomer contents of the hardened casting resins should be <1 wt. % (based on the total weight of the monomers and monomer units present), preferably <0.5 wt. %.

Advantageous effects of the invention:

The inventive casting resin suspensions are very good at meeting the requirements of industry for processibility and product quality of the final molded articles. In particular, the underlying problem of the invention, to produce molded articles with surface qualities resembling granite, has been solved very well. The "granite" appearance, which as a rule is limited to the bottom of the molded articles, is evidently brought about by the statistical distribution of a large number of light-reflecting particles which are fixed at or near the surface but in a nonuniform arrangement, and similarly distributed pigment particles. Molded articles prepared by the present method also meet requirements for mechanical and wear characteristics, e.g. for application in health and sanitary applications, for use in kitchenware, use in decorative panels, and the like.

Having generally described this invention, a further understanding can be obtained by reference to certain specific examples which are provided herein for purposes of illustration only and are not intended to be limiting unless otherwise specified.

EXAMPLE 1

Production of the casting resin:

A 104 g amount of methyl methacrylate was mixed uniformly with 2 g ethylene glycol dimethacrylate and 8 g gamm-methacryloyloxypropyl trimethoxysilane, with addition of 0.2 g n-butylamine. A 280 g amount of cristobalite ("Cristobalit T 6000", particle size 0.1–10 micron, a product of Quarzwerke, Cologne) was mixed-in portionwise over a period of c. 1 hr with the aid of a dissolving device ("UMA-Dissolver", produced by the firm VMA Getzmann Verfahrenstechnik Heienbach, of 5225 Reichshof, Germany), such that the viscosity of the mixture did not exceed 10 Pa-sec. In intervals between the additions of the portions of the cristobalite, particularly toward the end of the portionwise addition, the reaction was allowed to proceed without agitation.

The reaction mixture was then treated 24 hr on a set of rolls for rotating the cylindrical container. Then 6 g of a copolymer of methyl methacrylate and methyl acrylate with an η-specific/C value of 100 (ratio of MMA to MA 90:10 by weight; product Plex$^{(R)}$ 8640, of Roehm GmbH) was added. The viscosity (measured according to DIN 53211, with beaker diameter 6 mm) was 24 sec. 10 g silver "Decor-Pigment" supplied by the firm Naintsch Mineralwerke, of Graz, Austria (particle size 125–250 micron) was added to 200 g of such a suspension, followed by addition of 1.2 g bis(4tert-butylcyclohexyl)peroxydicarbonate, and the mixture was homogeneously mixed and dissolved (as applicable) with a vane-type or propeller-type stirrer. Then the air bubbles in the suspension were removed by application of an under pressure.

Production of a cast article:

Using two highly polished and chromed brass plates (350×350×4 mm—just a suggested size) and a rope seal (e.g. a PVC rope seal of diameter 4 mm), a mold chamber was formed into which the high filler content suspension was charged. After the sealing of the mold chamber, the chamber was allowed to stand in a horizontal position for 20 min at room temperature, then was held at controlled temperature in two stages—first at (e.g.) c. 65° C. in a water bath, with the mold chamber still in a horizontal position, for (e.g.) 20 min, and then at a higher temperature, (e.g.) 105° C., preferably in a drying cabinet, for 14 min. Then the molded polymer article was removed from the mold chamber, at c. 60°–70° C.

EXAMPLE 2

The casting resin was prepared as in Example 1, except that in place of the silver "Decor-Pigment", "Decor-Pigment Gold" (also supplied by the firm Naintsch), with particle size 125–250 micron, was used. The cast article was produced according to Example 1.

EXAMPLE 3

The casting resin was prepared as in Example 1, wherewith 0.01 wt. % Makrolexrot $^{(R)}$ GN (supplied by the firm Bayer), a dye which is soluble in methyl methacrylate, was dissolved in the final suspension.

The cast article was produced according to Example 1.

EXAMPLE 4

The casting resin was prepared as in Example 1, except that in preparing the suspension 4 g of the cristobalite was replaced by 4 g "RN 56" $TiO_2$, a white pigment supplied by the firm Kronos. The cast article was produced according to Example 1.

Appearances of the cast articles obtained in Examples 1–4:

The side of the plate which was on the bottom during hardening was evaluated.

Example 1: persuasive granite appearance, with a silver glitter.

Example 2: persuasive granite appearance, with a yellow gold glitter.

Example 3: persuasive granite appearance, with a reddish glitter.

Example 4: persuasive granite appearance, bright silver. In all Examples, the granite resemblance was very homogeneous.

A more complete appreciation of the invention and many of the attendant advantages thereof will be readily obtained as the same becomes better understood by reference to the following detailed description when considered in connection with the accompanying drawings.

What is claimed as new and desired to be secured by Letters Patent of the United States is:

1. A method for producing a filled plastic molded article based on polymethylmethacrylate, which article resembles granite, which comprises:
   (i) preparing a casting resin suspension comprising:
      (A) 20–80 parts by weight of a liquid polymethylmethacrylate polymer precursor;
      (ii) suspending metallic appearing particles of a stratified silicate which is a laminated air gap interference pigment comprising contiguous layers of medium to low refraction minerals with thin intercalated air gaps less than 1 μm thick and having a diameter to thickness ratio of laminae between 1:5 and 1:50, in a particle size range of 20–500 μm, in an amount of 1–35 pbw, based on component (A);
   (iii) polymerizing the suspension under free radical conditions in a polymerization mold to produce a polymerized filled plastic molded article which resembles granite; and
   (iv) removing the polymerized article from said polymerization mold,
   wherein said casting resin suspension further comprises
      (B) 40–75 pbw of a non-metallized particulate filler and said amount of metallic appearing particles of a stratified silicate is based on the sum of components (A) and (B).

2. The method of claim 1, wherein said casting resin suspension further comprises an amount of
   (C) up to 5 pbw of a polymerizable organosilicon compound, based on the sum of components (A) and (B).

3. The method of claim 1, wherein said casting resin suspension further comprises an amount of
   (D) up to 2 wt. % of at least one pigment or colorant based on a total weight of said casting resin suspension.

4. The method of claim 1, wherein said non-metallized particular filler is cristobalite.

5. The method of claim 1, wherein said stratified silicate has the chemical composition $SiO_2$ 34±2% MgO 32±2%, $Al_2O_3$ 20±1.5%, $Fe_2O_3$ 11±1%, $K_2O$ 1.2±0.5%, and CaO 0.1±0.05%.

6. The method of claim 1, wherein said stratified silicate has a gold or silver luster and has a particle diameter in the range of 250–500 μm.

7. The method of claim 1, wherein said stratified silicate has a particle diameter ranging from 125–250 μm.

8. The method of claim 1, wherein said non-metallized particulate filler is an inorganic filler having a mean particle size diameter of ≦100 μm.

9. The method of claim 1, wherein said casting resin suspension further comprises a dye in an amount of 0–0.5 wt. % based on a weight of a monomer phase.

* * * * *